(No Model.)
E. L. JORDAN & M. E. TAYLOR.
Ring for Jewelry.
No. 230,637.            Patented Aug. 3, 1880.
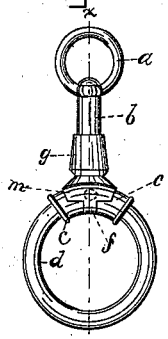
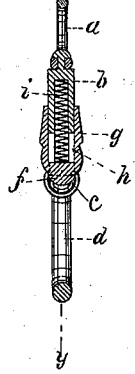
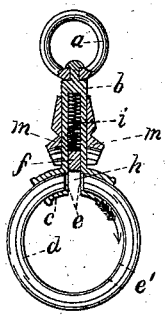
WITNESSES-
V. O. Dearborn.
L. F. Connor.
INVENTOR-
Edgar L. Jordan & Mathias E. Taylor.
by Crosby Gregory Attys

UNITED STATES PATENT OFFICE.

EDGAR L. JORDAN AND MATHIAS E. TAYLOR, OF NORTH ATTLEBOROUGH, MASSACHUSETTS.

RING FOR JEWELRY.

SPECIFICATION forming part of Letters Patent No. 230,637, dated August 3, 1880.

Application filed May 17, 1880. (No model.)

*To all whom it may concern:*

Be it known that we, EDGAR L. JORDAN and MATHIAS E. TAYLOR, of North Attleborough, county of Bristol, State of Massachusetts, have invented an Improvement in Rings for Jewelry, of which the following description, in connection with the accompanying drawings, is a specification.

Our invention relates to rings or fastenings for jewelry, and is intended as an improvement in that class of rings which are not solid, but split or open to allow a solid ring or other article to be inserted therein, after which the said open ring is adapted to be closed or fastened to retain the said article securely and prevent its escape and possible loss.

Our invention is herein shown embodied in a swivel for attaching a watch to its chain or other similar purpose; and it consists, chiefly, in the combination of a ring having a portion of its length removed—or, in other words, a strip of metal or other suitable material, circular in form, but lacking a short space necessary to form a complete circle—with a tube or socket therefor to cover a portion of the length of the said ring greater than the removed portion, and properly curved and fitted thereon to allow a free longitudinal movement or rotation on its axis of the said ring in the said socket, as will be hereinafter clearly shown in connection with accompanying drawings.

It will be readily understood that by such longitudinal movement or rotation of the ring in its socket the open or removed portion thereof can be brought out from the said socket when the solid or closed pendent ring of a watch, locket, or other similar article may be passed through the said opening and the open ring revolved to bring its open or removed portion within the socket, which then covers the same, and thus prevents the escape of the inserted article. In addition to the open ring and its socket, a fastening device is needed to retain the ring with its open or separated portion in the said socket, so that it cannot accidentally slip around and allow the inclosed article to escape.

As herein shown, the fastening device consists of a tongue or block, which is pressed by a spring toward the ring and falls into the opening therein when it arrives at proper position in the socket, and which may be withdrawn, when desired, to rotate the ring to insert or remove an article.

When used with a swivel this locking device may be carried by an ornamental sleeve upon the stem of the said swivel and free to move longitudinally thereon to lock or unlock the fastening-ring.

Figure 1 is a side view of a watch-chain swivel embodying our invention, being shown in its normal condition to retain an article inserted therein; Fig. 2, a longitudinal section thereof on line $x\,x$; and Fig. 3, a longitudinal section thereof on line $y\,y$, Fig. 2, showing the locking device in position to allow the rotation of the ring preparatory to the insertion or removal of an article.

The small ring $a$, intended to be in permanent connection with the watch-chain, is secured with a swivel-joint free to turn on the upper end of the swivel-stem $b$, connected at its lower end with the curved socket $c$ of the ring $d$. The said ring $d$ is not a solid complete ring, being circular in form, but lacking a short portion of its length necessary to make a complete circle, and thus leaving an opening, $e$, from the exterior to the interior thereof. The said ring fits in the socket $c$ so as to rotate freely therein, as indicated by the arrow, Fig. 3, and when the opening $e$ is brought outside the said socket $c$, as indicated by the dotted lines at $e'$, an article of the proper size can be passed through the said opening, and then when the ring is turned back or farther forward the proper distance, the opening $e$ is again brought within the socket $c$, so that in this position the ring and socket together form a complete inclosure to prevent the escape of the article inserted therein.

When the opening $e$ is in the proper position in the socket $c$ it is prevented from further rotation by the locking device, shown as a block, $f$, attached to the sleeve $g$, and free to slide in a slot, $h$, in the socket $c$ and stem $b$, which is made hollow to contain the spring $i$, to act on the block $f$ and press it down into the opening $i$ when in the proper position.

The sleeve $g$ is free to slide longitudinally on the outside of the stem $b$, and is provided with a shoulder, m, which, in its normal position, rests upon the socket c, the block f then fitting the slot h, as shown in Fig. 1.

It is obvious that the construction can be considerably modified without departing from my invention—as, for example, the slot h need not extend through the lower part of the socket c, in which case only the upper portion of the block f would be used, as shown in Fig. 2, of rectangular form, inclosed by dotted lines. In construction it might then be a pin, as indicated by dotted lines, Fig. 1, passing across the lower portion of the sleeve g.

In the construction of the form shown the tubular stem b is made and joined, as by soldering, to the curved socket c, and the slot h then cut. The sleeve g is slipped over the stem b before the ring a is attached thereto, the spring i inserted in the stem b, and the block f attached to the sleeve, as by soldering or riveting.

The sleeve g may be ornamental in design and so related to the stem b and socket c as to appear to form a single piece therewith, in which case it is quite difficult for the uninstructed to discover the method of opening the ring.

We claim—

1. In a fastening-ring for jewelry, a movable ring provided with an opening and a socket therefor, curved to properly fit the said ring and allow the same to be rotated or moved longitudinally therein to bring the opening outside of or wholly within the said socket, to allow an article to be inserted and securely retained, combined with a sliding spring-pressed locking device to retain the said ring in position with its open part within and closed by the socket, substantially as described.

2. In a fastening-ring for jewelry, a ring provided with an opening and a curved socket therefor, having a transverse slot, combined with a block adapted to slide in the said slot to engage or disengage the opening in the ring to lock or release it and allow the opening to be brought outside the said socket, substantially as and for the purpose described.

3. In a swivel for watch-chains and similar articles, a ring provided with a transverse opening and a slotted socket therefor, connected with the swivel-stem, combined with a sleeve free to move longitudinally on the said stem, and provided with a block to move in the slot of the socket to engage and hold or release the said ring, and a spring tending to place and retain the said block in position to lock the said ring when not positively disengaged therefrom by the operator, substantially as described.

In testimony whereof we have signed our names to this specification in the presence of two subscribing witnesses.

EDGAR L. JORDAN.
MATHIAS E. TAYLOR.

Witnesses:
HENRY M. HERRING,
CHARLES O. SADLER.